United States Patent
Fatla

(10) Patent No.: US 11,628,760 B2
(45) Date of Patent: Apr. 18, 2023

(54) SYSTEM AND METHOD FOR WASTE REMOVAL WITH AN EXTENDED SLOPE CONTAINER

(71) Applicant: Gregory Fatla, Hixton, WI (US)

(72) Inventor: Gregory Fatla, Hixton, WI (US)

( * ) Notice: Subject to any disclaimer, the term of this patent is extended or adjusted under 35 U.S.C. 154(b) by 333 days.

(21) Appl. No.: 17/101,898

(22) Filed: Nov. 23, 2020

(65) Prior Publication Data
US 2022/0161704 A1 May 26, 2022

(51) Int. Cl.
*B60P 1/43* (2006.01)
*B60P 1/54* (2006.01)
*B60P 3/41* (2006.01)
B62D 63/08 (2006.01)

(52) U.S. Cl.
CPC ............ *B60P 1/5423* (2013.01); *B60P 1/435* (2013.01); *B60P 3/41* (2013.01); B62D 63/08 (2013.01)

(58) Field of Classification Search
CPC ............... B60P 1/435; B60P 3/40; B60P 3/41
See application file for complete search history.

(56) References Cited

U.S. PATENT DOCUMENTS

| | | | | |
|---|---|---|---|---|
| 2,452,681 A | * | 11/1948 | Rehberger | B60P 1/6454 414/484 |
| 2,721,758 A | * | 10/1955 | Allen | B60P 1/435 296/61 |
| 4,173,423 A | * | 11/1979 | Pickrell | B65F 3/26 414/404 |
| 4,676,431 A | * | 6/1987 | Teske | B65F 1/122 220/908 |
| 4,750,777 A | * | 6/1988 | Brammer | B62D 33/0273 296/50 |
| 4,948,324 A | * | 8/1990 | Niederer | B60P 1/34 414/415 |
| 5,100,279 A | * | 3/1992 | Bjerk | B60P 1/483 298/23 D |
| 5,769,593 A | * | 6/1998 | Buffaloe | B60P 1/435 296/61 |
| 6,102,646 A | * | 8/2000 | Bass | B60P 1/435 296/61 |
| 6,126,223 A | * | 10/2000 | Rayburn | B60P 1/438 296/61 |

(Continued)

FOREIGN PATENT DOCUMENTS

CN 113276991 A * 8/2021
CN 114771387 A * 7/2022
(Continued)

*Primary Examiner* — Hilary L Gutman
(74) *Attorney, Agent, or Firm* — Carlin Law LLC

(57) ABSTRACT

A waste removal system with a trailer for the storage of materials such as waste or rubble, wherein the trailer has a front wall, a rear wall, and plurality of side walls with an extended slope on at least one of the walls to increase the volume capacity therein. The trailer may additionally contain a slanted access door or ramp which alternatively raises and lowers, allowing for ease of ingress and egress of the trailer volume. The waste removal system may additionally include a transport vehicle with a grappler mounted at a distal end of a boom, wherein the grappler grasps waste and deposits the waste into the previously-mentioned trailer for transport to and from a desired location.

9 Claims, 8 Drawing Sheets

(56) References Cited

U.S. PATENT DOCUMENTS

| | | | | |
|---|---|---|---|---|
| 6,135,532 | A * | 10/2000 | Martin | B60P 3/36 |
| | | | | 296/61 |
| 6,902,226 | B1 | 6/2005 | Taylor | |
| 6,923,452 | B1 | 8/2005 | Zachmeier et al. | |
| 7,036,863 | B2 * | 5/2006 | Hunter | B60P 1/435 |
| | | | | 296/61 |
| 7,112,030 | B2 | 9/2006 | Renziehausen | |
| 8,684,437 | B1 | 4/2014 | Collins | |
| 10,974,896 | B1 * | 4/2021 | Vaselaar | B65F 3/20 |
| 2007/0040405 | A1 * | 2/2007 | Coble | B60P 1/435 |
| | | | | 296/61 |
| 2007/0231114 | A1 * | 10/2007 | Westrate | B60P 1/435 |
| | | | | 414/545 |
| 2011/0121601 | A1 * | 5/2011 | Zielinsky | E05C 17/36 |
| | | | | 296/57.1 |
| 2015/0329159 | A1 * | 11/2015 | Fliegl, Sr. | B60P 1/006 |
| | | | | 296/26.09 |
| 2017/0174429 | A1 * | 6/2017 | Rimsa | B65F 3/041 |

FOREIGN PATENT DOCUMENTS

| | | | | |
|---|---|---|---|---|
| DE | 2302861 | A * | 7/1974 | B60P 1/435 |
| DE | 3325212 | A * | 1/1985 | B60P 1/435 |
| DE | 202006011495 | U1 * | 11/2006 | A01G 23/003 |

\* cited by examiner

SYSTEM AND METHOD FOR WASTE REMOVAL WITH AN EXTENDED SLOPE CONTAINER

FIELD

The present invention is directed to the field of waste removal systems, and more particularly to waste removal using a pull behind trailer from which to deposit and subsequentially remove waste from an area.

BACKGROUND

The need to transport waste from a site to another site is well documented. Whether the waste comes from residential construction, commercial construction, or from a storm cleanup, the need to efficiently load and unload various amounts of waste and debris is well established. Therefore, a large quantity of trailers, dump vehicles, and box vehicles have been developed and produced.

In some capacities, in order to remove the waste, the vehicle must not only lift the material with a crane or a grapple boom but must also unload it onto a separate vehicle in order to haul it away from its current location. Currently, the most common method is to have an excavator on-site with a dump truck nearby. The excavator will grasp the debris and load it into the dump truck, whereupon the dump truck transports said debris off-site. It is not economical nor practical to utilize two vehicles in many tasks. Additionally, the cost to purchase a trailer vehicle is prohibitive for many persons and companies.

Another method used is to install a dump box or a large trailer on the vehicle in which the crane or boom is also employed. In such a fashion, a single machine can be employed for the entire task. However, in use today most dump boxes are immobile vessels. This requires the crane or another secondary crane or backhoe to grasp and remove said debris from the dump box itself. Whichever method is utilized results in a time-consuming process.

Another issue is that debris, particularly with storm or hurricane cleanup, may be scattered in a large area. If a dump box or trailer is installed on a machine with a boom or crane, the size restriction for the dump box or trailer holding vessel is limited to the reach of said boom or crane.

What is needed, therefore, is a device which can accompany a crane or boom operated vehicle so as to decrease the amount of trips required to remove waste from a particular area, reduce the amount of time each task requires, and subsequently therefore reduce the cost per waste removal job.

BRIEF SUMMARY

The present invention is directed to an extended slope container, and a system or method therefore, wherein material is able to be grasped by a crane or boom and deposited in said extended slope container. The extended slope container may be employed on a trailer frame or may alternatively be deployed upon a vessel such as a ship, a log truck loader, a dump truck, or the like. If the container is deployed on a trailer, the trailer may additionally comprise wheels, skis, or tracks so as to be pulled by a transport vehicle to a desired location. The trailer may also contain a hitch or other adaptable connection device so as to be removably connected to or by said transport vehicle.

The extended slope container has a receiving receptacle volume which is defined herein as the volume of space created between a plurality of walls so that it is capable of receiving the material as previously mentioned.

The extended slope container comprises a container body having a bottom floor otherwise known as a bottom wall, a plurality of side walls, a front wall, and a rear extended slope wall. The sidewalls, front wall, and rear wall all extend upwards, or vertically therefrom, creating a container. The rear wall is sloped generally externally away, otherwise known as diagonally upward or diagonally away from the bottom wall such that greater volume is created within the receptacle volume. Preferably, the rear extended slope wall additionally comprises a ramp, such that ingress and egress into and from the receptacle volume is able to be achieved from an external position therefrom.

The rear wall may open outwards such as dual doors or may fold downwards until it makes contact with a parallel surface underneath the longitudinal axis of the bottom wall, such as the ground or a floor. This allows the rear wall to become a ramp for vehicles or human users or the like to enter the receptacle volume. This position of the rear wall employed as a ramp may be referred to herein as a first open position, and when the rear wall is closed it may be referred to as a second closed position.

To ensure that the ramp is closed securely when in the second closed position, a tab may be affixed to the rear wall, either on in the interior or the exterior of said rear wall, wherein a securing mechanism attached to the container body may move to connect with said tab. In such a fashion, the rear wall will be in essence locked into place by way of the securing mechanism. Said securing mechanism is presently thought to be an arm, a rod, a door bar, a barricade, or any other device which may help to prevent movement or accidental actuation of the rear wall.

The rear wall may additionally comprise a hinge or a plurality thereof at a lower portion, connecting the rear wall to the bottom wall. The hinge or hinges will thus allow for movement of the ramp in a generally diagonally vertical motion, as may be appreciated when viewing the drawings herein. Alternatively, the rear wall may additionally comprise a hinge or a plurality thereof on a side portion of said rear wall, to contact with a distal end of the sidewall, or sidewalls as the case may be. This will allow for the movement of the rear wall to swing out as a door, or swing outwards from two portions, as a saloon door. Alternative embodiments may comprise a pair of pistons attached to the rear wall and near or to the plurality of sidewalls within the container body, otherwise known as the inner receptacle volume, such that the rear wall ramp may alternatively move between the first open position and the second closed position.

In one embodiment, when the rear wall is moved to the first open position, the rear wall extends out and past a longitudinally created axis of the bottom wall, and makes contact with a generally horizontal surface below that of the container, such that the rear wall acts as an access ramp. The rear wall may additionally comprise access slants at an inner portion thereof, such that a human user can ambulate on said access slants, and use the access slants as stairs to more easily ingress and egress the interior of the container.

To actuate movement of the rear wall from the closed second position to the open first position, a D-ring may be installed on the interior rear wall. The D-ring may additionally comprise a chain with a first end connected to the D-ring and a second end hanging therefrom. This second end of the chain may be grasped or otherwise connected to or by the boom or crane to slowly ease from the second closed position to the first open position, or it is contemplated that a winch may be connected within or on the container body, and said winch may grasp the second end of the chain so as to ease and alternatively lower and raise the ramp wall therefore.

It is presently thought to be preferable that the front wall additionally comprises a generally v-shaped opening thereon at an upper distal position away from the bottom wall, such that a crane or boom can enter the receiving receptacle volume to load or unload material therefrom.

A waste removal system is contemplated herein where a transport vehicle having a grappler with a crane or a boom is provided. The grappler is contemplated to have a first jaw and a second jaw so that it can grasp material in a generally pinching motion. This allows for the grappler to be deployed to pick up waste. It is presently contemplated that the transport vehicle may tow a trailer frame upon which the extended slope container body is positioned. The crane or boom and grappler thereon can ingress the interior of the container body and release the previously gripped material. The extended slope of the container allows for the grappler to be placed in the entirety of the container, while also creating a greater volume for the additional containment of material.

These and various other features, advantages, modes, and objects of the present invention will be made apparent from the following detailed description and any appended drawings.

BRIEF DESCRIPTION OF THE DRAWINGS

One or more preferred exemplary embodiments of the disclosed invention are illustrated in the accompanying drawings in which like reference numerals represent like parts throughout and in which.

Before explaining one or more embodiments of the disclosed invention in detail, it is to be understood that this invention is not limited in its application to the details or modes of construction and the arrangement of the components set forth in the following description or previously disclosed illustrations. This invention is capable of multiple embodiments and modes, which can be practiced or carried out in many various ways. Also, it is to be understood that the phraseology and terminology employed herein is for the purpose of description, and should not be regarded as limiting, or used as an absolute.

DETAILED DESCRIPTION

Figure 1:
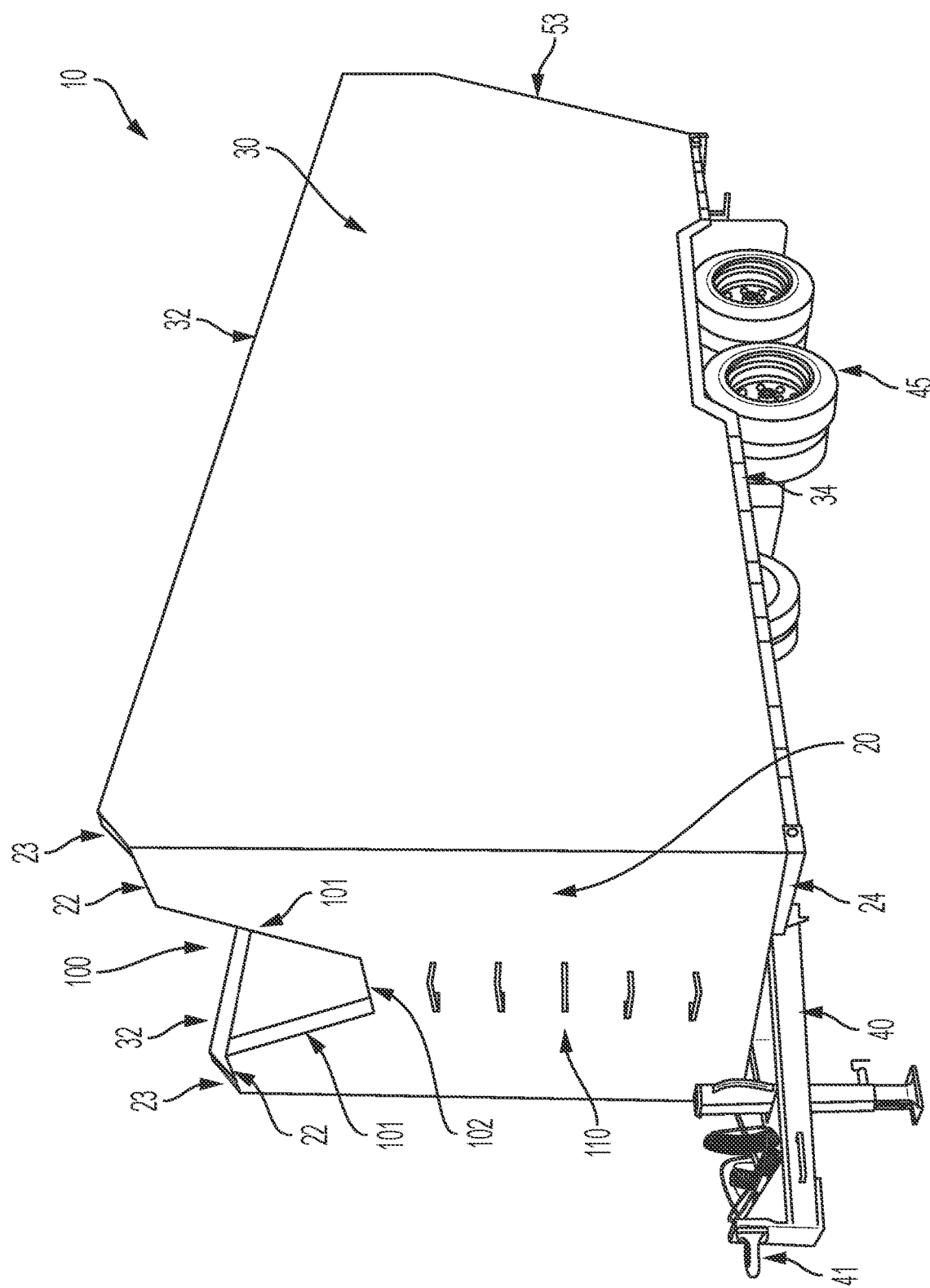
FIG. 1 is a side perspective view of an embodiment of the Extended Slope Container.
Figure 2:
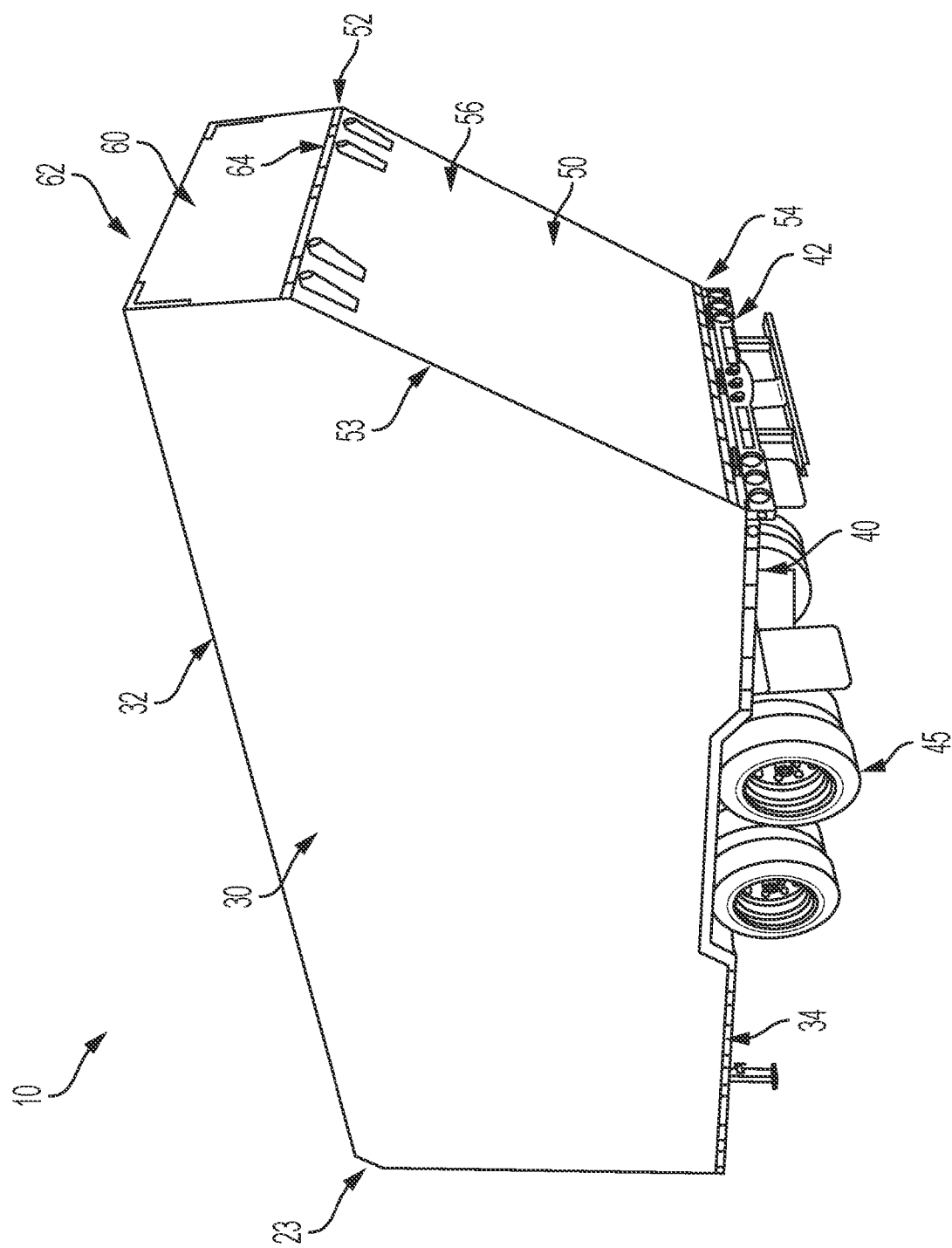
FIG. 2 is a side perspective view of an embodiment of the Extended Slope Container.

Referring now to the drawings in detail, FIG. 1 illustrates a preferred, but not the only, embodiment of an Extended Slope Container 10 is presented in accordance with the present disclosure. As shown, the Extended Slope Container 10 is deployed upon a trailer frame 40 having a trailer frame first end 41 and a trailer frame second end 42, as shown in FIG. 2, and illustrates trailer frame wheels 45 thereon. This embodiment of the Extended Slope Container 10 illustrates vertically extending side walls 30 having a side wall bottom end 34 and a side wall top end 32, a vertically extending front wall 20, whereupon said front wall 20 has a front wall bottom end 24 on one distal end, and a generally v-shaped opening 100 at or near the opposing end.

Figure 6:
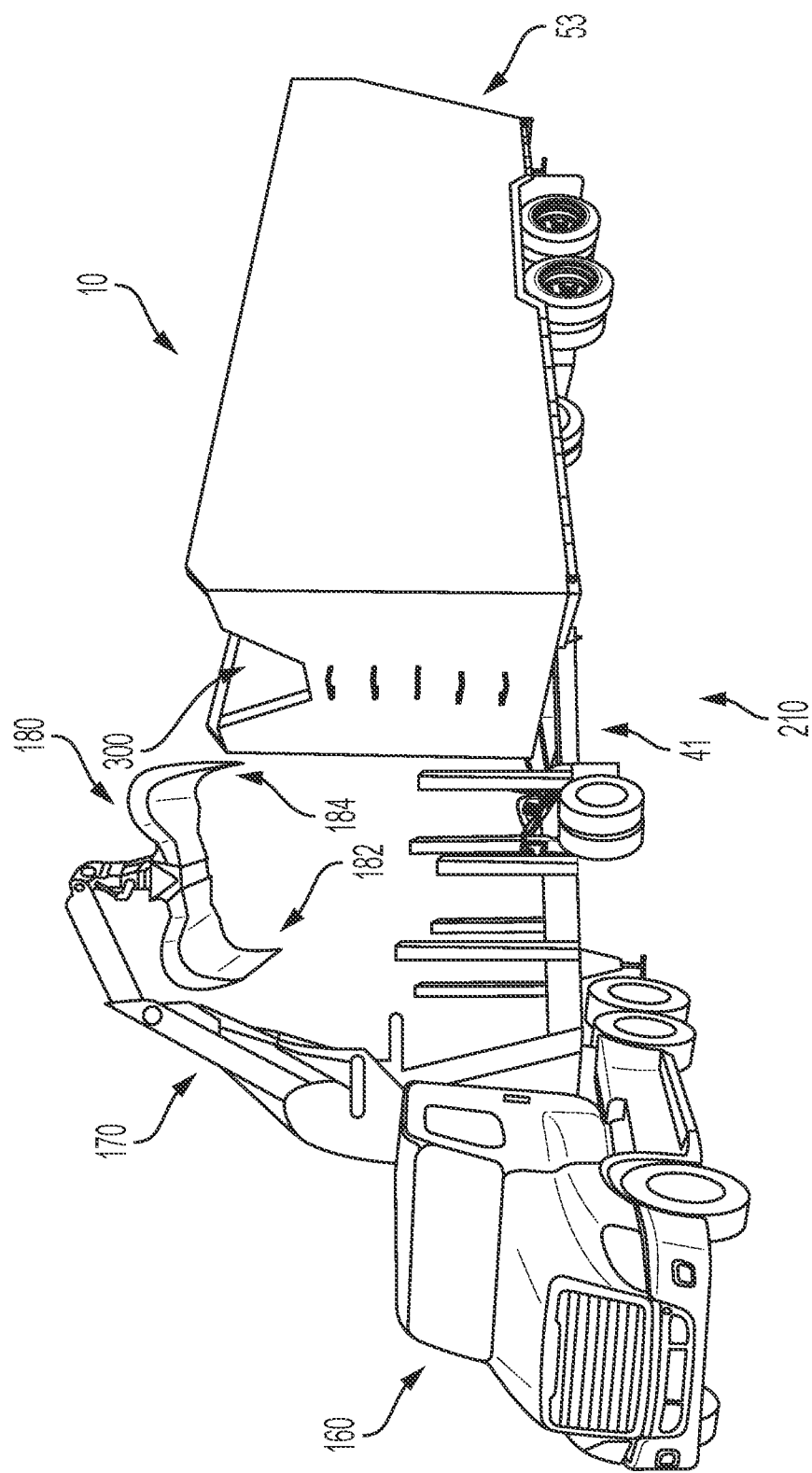
FIG. 6 is a side view of an embodiment of a waste removal system, showing a transport vehicle with a grappler mounted at a distal end of a boom.

The front wall top end 22 is the upper portion of said front wall 20 and the generally v-shaped opening 100 thereof. In some embodiments, a sloped running wall 23 is present, which is an additional height raise to reach equilibrium with the side wall top end 32. Turning back to the generally v-shaped opening 100, it is formed through a plurality of opening side walls 101, and a opening lower wall 102. This space, as described earlier, is preferably able to receive the entry of a grappler 180, bucket, or similar device upon a distal end of a boom 170, crane, or a similar device, such that said device can reach farther into the rear portion of the interior of the Extended Slope Container 10, as is shown in FIG. 6. In this particular embodiment of FIG. 1, the front wall 20 has additional exterior front wall steps 110, such that a human user alternatively can move up and down vertically at a point from the trailer frame 40 to the generally v-shaped opening 100.

Now looking at FIG. 2, the Extended Slope Container 10 is shown from a perspective generally rearward view. This embodiment of the Extended Slope Container 10 is deployed upon a trailer frame 40 having trailer frame wheels 45 and highlights the trailer frame second end 42, which is known as the point upon which the rear wall ramp 50, otherwise known as a foldable ramp, extends generally diagonally vertically away at a position known as the rear wall ramp bottom 54 from the trailer frame 40 to the rear wall ramp top 52, as depicted. As described earlier, the diagonal position of the rear wall 53 creates an extended slope of the rear wall ramp 50 allows for increased volume within the Extended Slope Container 10. Shown here is the second closed position 56 of the rear wall ramp 50, allowing for the Extended Slope Container 10 to be able to receive and contain materials therein. In some, but not all, embodiments, the rear wall ramp top 52 connects with a upwardly projected rear face 60 at the upwardly projected rear face bottom 64, said upwardly projected rear face 60 extending vertically to a upwardly projected rear face top 62, which is generally level with the side wall top end 32. In such a fashion, the upwardly projected rear face 60 allows for even greater volume within the Extended Slope Container 10.

Figure 3:
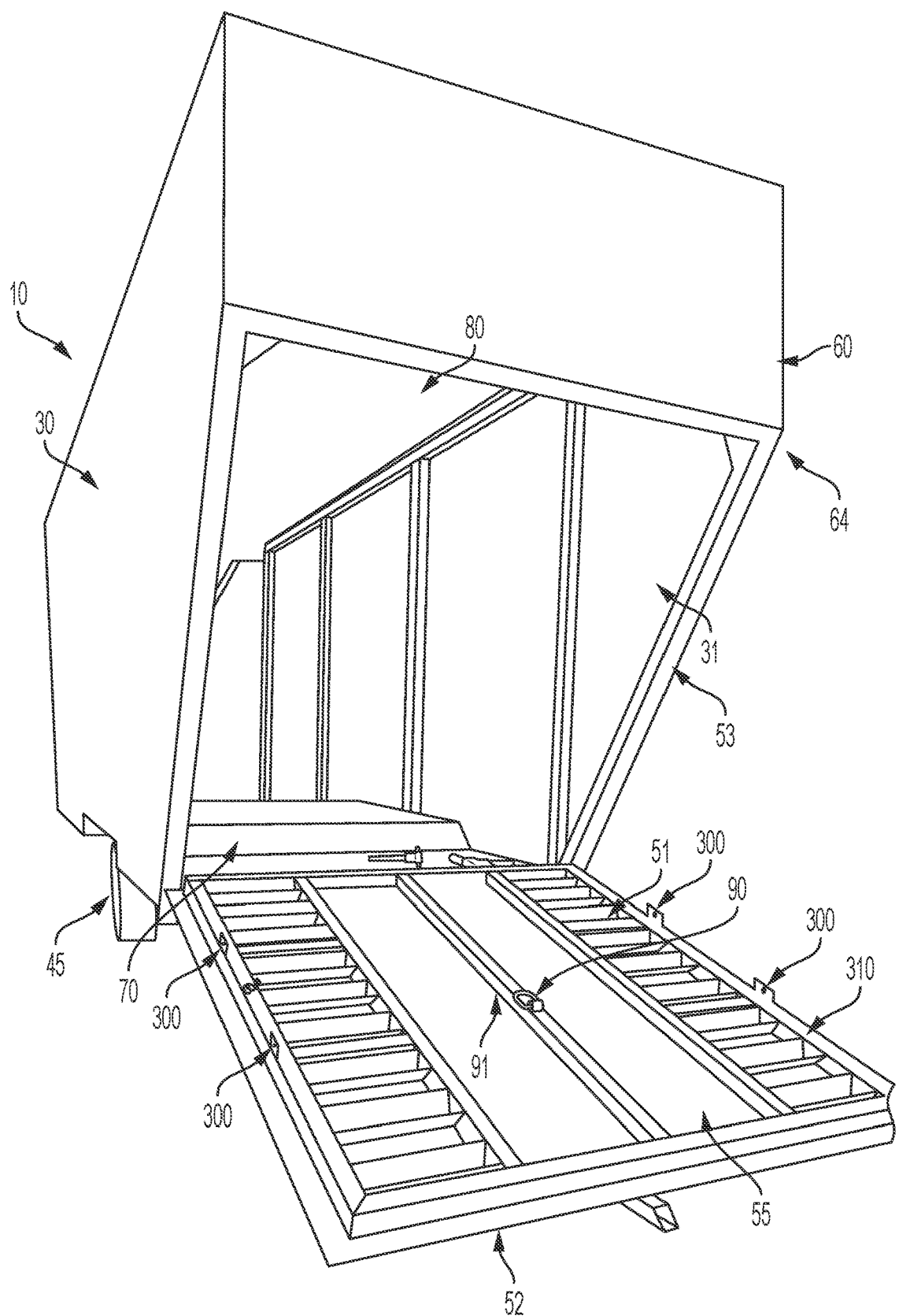
FIG. 3 is a rear perspective view of an embodiment of the Extended Slope Container shown with a rear wall ramp in a deployed first open position.

Turning to FIG. 3, the Extended Slope Container 10 is shown with a first open position 55, highlighting the material receiving receptacle volume 80, otherwise known as the interior volume or container volume, and the rear wall ramp interior 51. As previously mentioned, the rear wall ramp 50 has extended beyond the longitudinal axis created by the bottom wall 70 of the Extended Slope Container 10, which is also referred to as a container floor 70. Additionally, the rear wall ramp interior 51 has access slants 310 in this embodiment, which allows for a human user to walk more easily up and down. Moving further into this drawing, it is shown a D-ring 90 positioned in a generally central location 91 as to the rear wall ramp interior 51. Also shown here is optional additional securing tabs 300, for use in securing the rear wall ramp 50 as is apparent when looking at FIG. 5.

Figure 4:
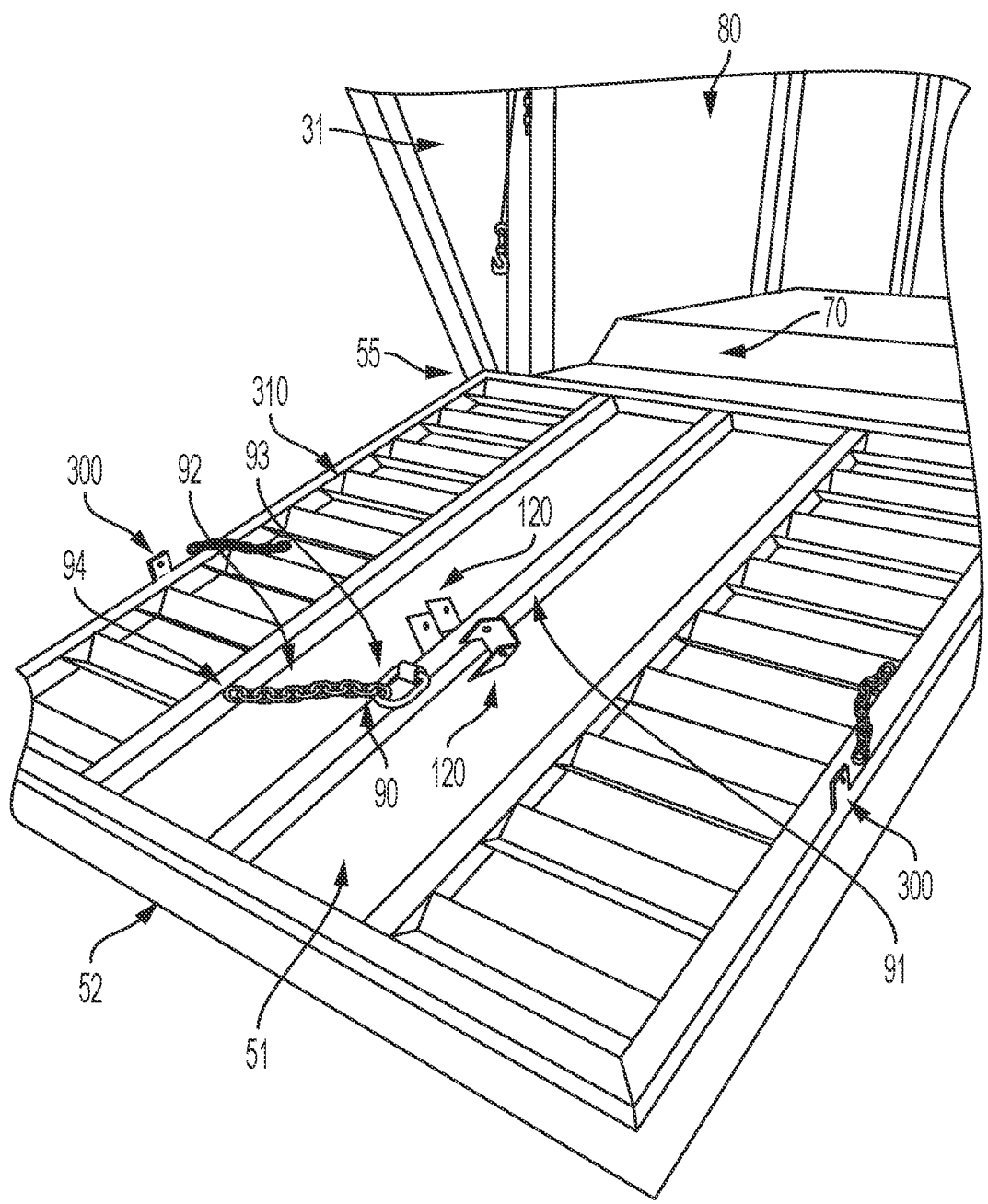
FIG. 4 is an interior perspective view of a rear wall ramp of an embodiment of the Extended Slope Container in a deployed first open position.

Look now at FIG. 4. An embodiment of the Extended Slope Container 10 in a first open position 55 is shown, wherein tabs 120 are provided for securing. Additionally, a D-ring 90 is provided, whereupon a chain 92 is attached at a chain first end 93, leaving a chain second end 94 exposed, such that a device or human user can grasp the chain second end 94, and provide generally horizontal pulling force thereon in a direction away from the rear wall ramp interior 51, which will allow for the rear wall ramp 50 to move from a first open position 55 to a second closed position 56.

Figure 5:
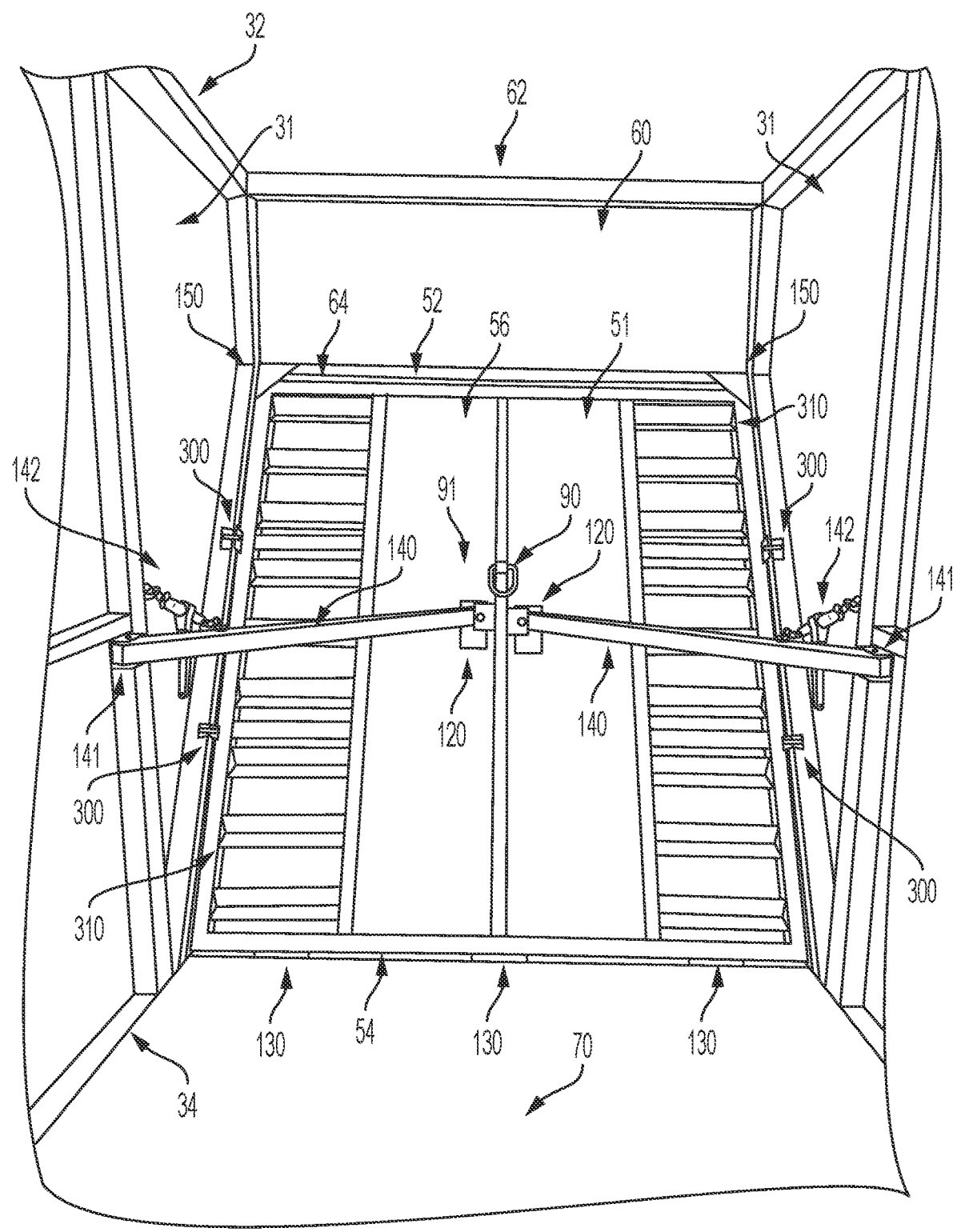
FIG. 5 is an interior view of an embodiment of the Extended Slope Container viewing the rear wall ramp in a second closed position, utilizing a securing mechanism.

The rear wall interior 51 of the Extended Slope Container 10 is shown in FIG. 5, wherein the rear wall ramp 50 is in the second closed position 56 and said rear wall ramp 50 is secured in place. In this particular embodiment, near the rear wall ramp bottom 54 is employed a plurality of hinges 130, which allows for the diagonal movement of the rear wall ramp 50 to and beyond a longitudinal axis of the container floor or bottom wall 70. It is presently thought that a single hinge 130 may also serve this purpose.

The tabs 120 are shown receiving a securing mechanism 140, which is shown here as a barricade arm which is attached to the side wall interior 31 at a securing mechanism attachment point 141. Additional securing mechanisms 142 are shown here, which keep the rear wall ramp 50 taut and prevents accidental movement or jostling. The additional securing tabs 300 are provided on the sides of the rear wall ramp 50, which are able to be positioned in place with a pin or bolt, for extra rigid positioning. In such a manner, the rear wall ramp 50 is positioned securely against a coverage overhang 150, which are located near or on the interior of the upwardly projected rear face bottom 64, and or the rear wall ramp top 52.

A waste removal system 210 is shown in FIG. 6, wherein the Extended Slope Container 10 is deployed on a trailer frame 40 and connected to a transport vehicle 160 at the trailer frame first end 41. In this particular embodiment of the system, a grappler 180 is employed on a distal end of a boom 170, said boom 170 being connected or attached to the transport vehicle 160. The grappler 180 has a grappler first jaw 182 and a grappler second jaw 184, such that material can be grasped in a pinching movement between the first jaw 182 and the second jaw 184. In such a fashion, the boom 170 may then maneuver above or into the generally v-shaped opening 100, such that the grappler 180 is positioned within or above the interior volume 80 of the Extended Slope Container 10. The grappler 180 is able to then release the first jaw 182 and the second jaw 184 from the pinching movement and release the material within the interior volume 80.

Figure 7:
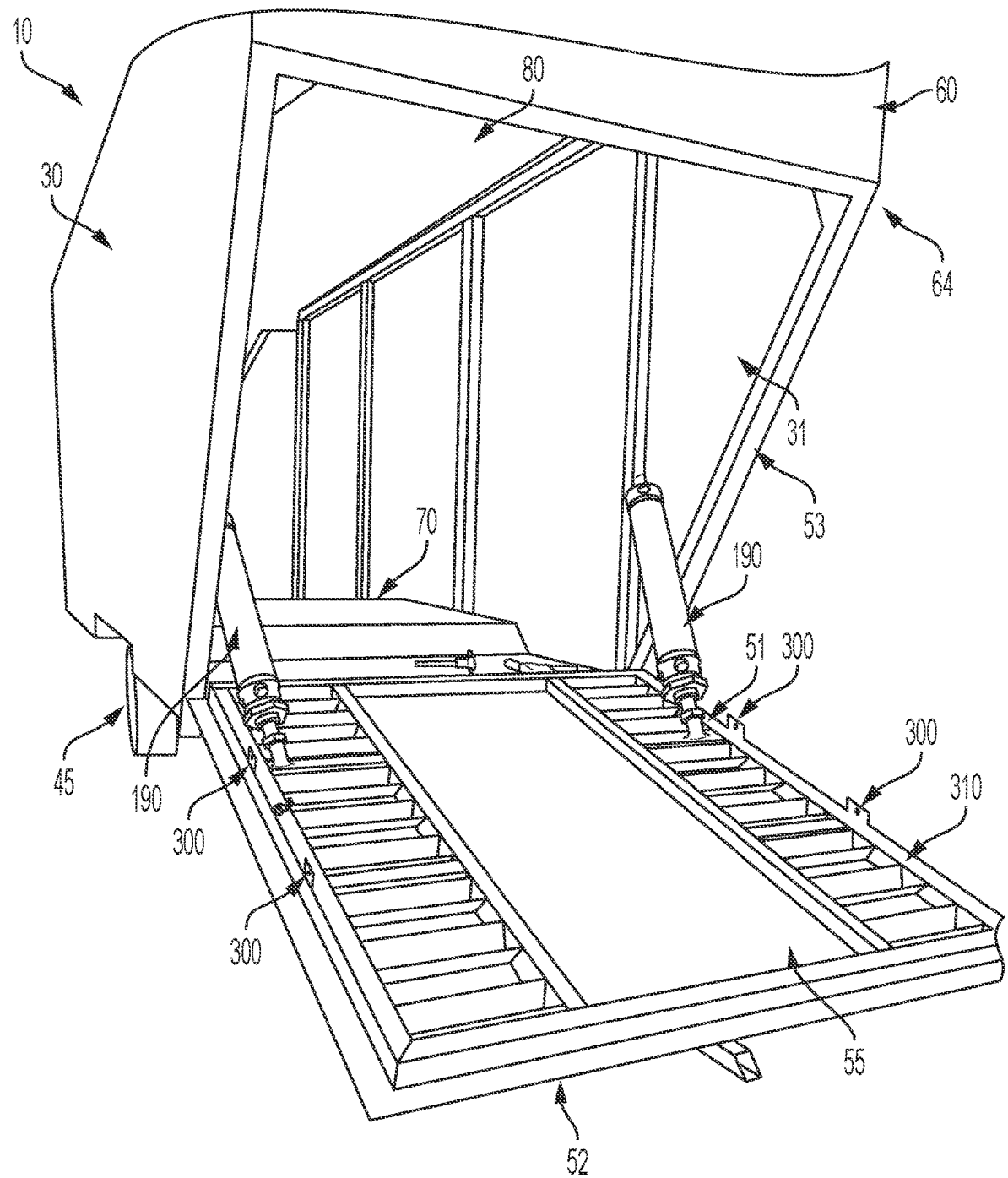
FIG. 7 is an interior perspective view of a rear wall ramp of an embodiment of the Extended Slope Container in a deployed first open position, utilizing a plurality of pistons.
Figure 8:
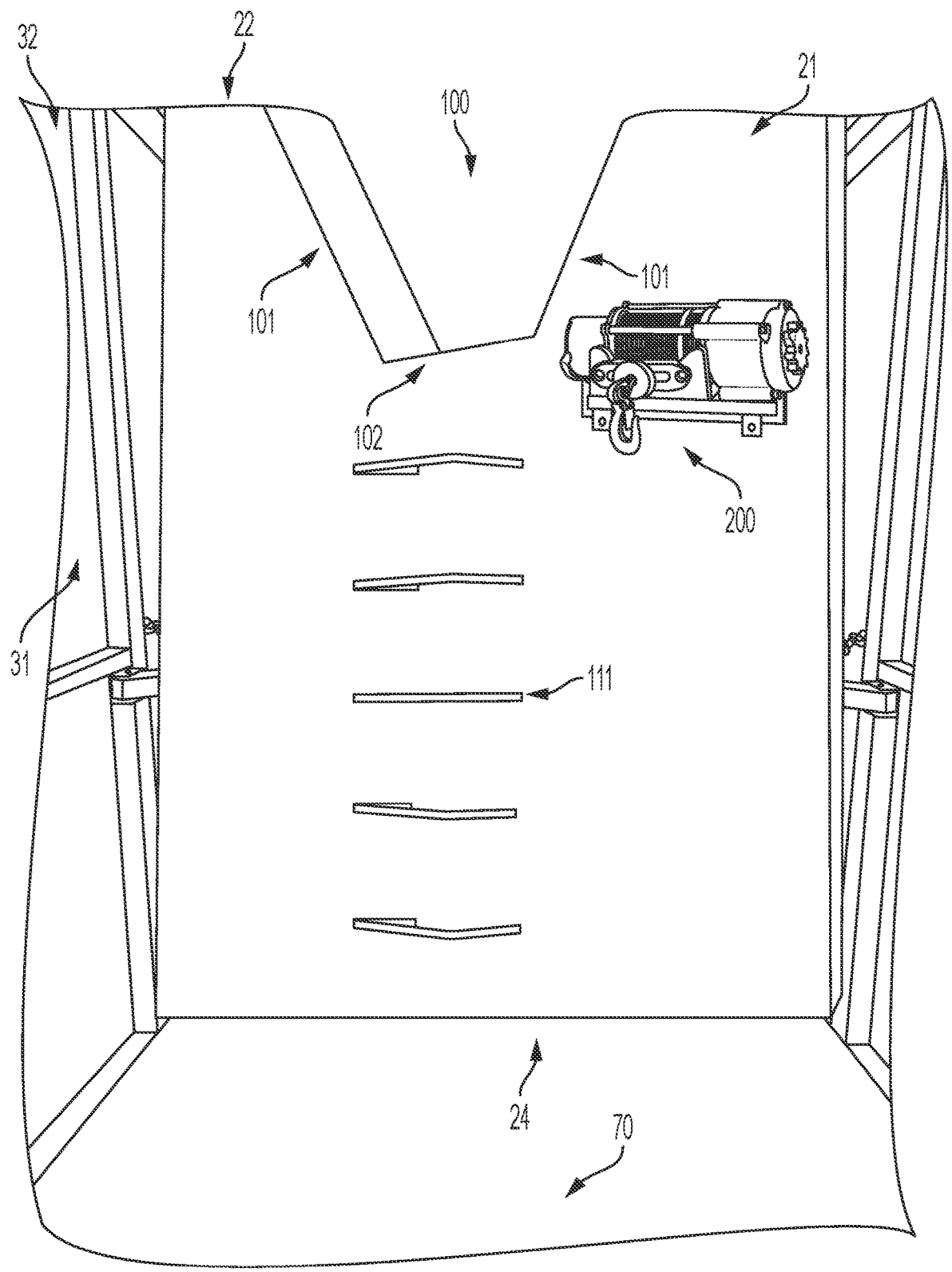
FIG. 8 is an interior perspective view of a front wall wherein a winch is provided attached to the interior front wall.

Turning to FIG. 7, an alternative embodiment of the Extended Slope Container 10 is shown in the first open position 55. The rear wall ramp interior 51 is viewed, with the addition of air cylinders or pistons 190. The pistons 190 will thus allow for the rear wall ramp 50 to alternatively move between the first open position 55 and the second closed position 56.

The front wall interior 21 is depicted from a perspective view of the Extended Slope Container 10 within the material receiving receptacle volume 80. Upon the front wall interior 21 in this embodiment are front wall interior steps 111, which allow for a human user to ingress and egress the Extended Slope Container 10. Further, an optional winch 200 is employed, positioned or attached to the front wall interior 21. Should this winch 200 be provided, said winch 200 may grasp the chain second end 94, shown in FIG. 4, and alternatively provide the horizontal pulling and slowly releasing said tension thereon to induce the rear wall ramp 50 to move between the first open position 55 and the second closed position 56.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood and appreciated that, although the foregoing description and drawings describe and illustrate in detail one or more preferred embodiments of the present invention, to those with skill in the art to which the present invention relates, the present disclosure will suggest many modifications and constructions, as well as widely differing embodiments and applications without thereby departing from the spirit and scope of the invention and method disclosed thereof.

What is claimed is:

1. An extended slope container for receipt and storage of material and comprising:
   a trailer frame having a first end and a second end; and
   a container body mounted on said trailer frame, said container body comprising:
      a front wall, a rear wall ramp, a plurality of side walls, and a bottom wall, which together define a material receiving receptacle volume;
      wherein said front wall extends upward from the bottom wall;
      wherein said front wall additionally defines a generally v-shaped opening thereon at a distal position away from the bottom wall;
      wherein all said side walls extend upward from the bottom wall;
      wherein said rear wall ramp is moveably attached to the bottom wall and extends diagonally upward and away from said bottom wall;
      further comprising a D-ring with a chain having a first end and a second end, said first end attached to the D-ring, and said D-ring attached to the rear wall ramp at a generally central position within the material receiving receptacle volume;
      wherein said rear wall ramp is moveable from a first open position, generally at or beyond a longitudinal axis of the bottom wall so as to allow access to the material receiving receptacle volume, to a second closed position so as to prevent access to the material receiving receptacle volume.

2. The extended slope container of claim 1, wherein the trailer frame has wheels.

3. The extended slope container of claim 2, further comprising a tab affixed to the rear wall ramp, and further comprising a securing mechanism attached to a side wall of the container body, wherein said securing mechanism is adapted to be received by the tab.

4. The extended slope container of claim 3, wherein the rear wall ramp is moveably attached to the bottom wall with a hinge.

5. The extended slope container of claim 4, wherein the rear wall ramp additionally comprises access slants.

6. The extended slope container of claim 5, further comprising a pair of pistons attached to the rear wall ramp and to the plurality of side walls of the container body so as to move the rear wall ramp between the first open position and the second closed position.

7. The extended slope container of claim 2, further comprising a winch mounted to the container body.

8. The extended slope container of claim 4, wherein the container frame first end is adapted to be received by a vehicle.

9. The extended slope container of claim 8, wherein the vehicle is a log truck loader.

* * * * *